US011069252B2

(12) United States Patent
Ghatage et al.

(10) Patent No.: US 11,069,252 B2
(45) Date of Patent: Jul. 20, 2021

(54) COLLABORATIVE VIRTUAL ENVIRONMENT

(71) Applicant: Accenture Global Solutions Limited, Dublin (IE)

(72) Inventors: Prakash Ghatage, Bangalore (IN); Kumar Viswanathan, Bangalore (IN); Santhosh Kumar Rajavelu Balachandar, Bangalore (IN); Vinu Varghese, Bangalore (IN); Raghavan Iyer, Bangalore (IN); Ashwin D'Silva, Prabhadevi (IN)

(73) Assignee: Accenture Global Solutions Limited, Dublin (IE)

( * ) Notice: Subject to any disclaimer, the term of this patent is extended or adjusted under 35 U.S.C. 154(b) by 473 days.

(21) Appl. No.: 15/959,892

(22) Filed: Apr. 23, 2018

(65) Prior Publication Data
US 2019/0325771 A1    Oct. 24, 2019

(51) Int. Cl.
*G09B 7/02* (2006.01)
*G06F 3/01* (2006.01)
*G09B 5/10* (2006.01)
*G09B 5/06* (2006.01)
*G06F 16/2457* (2019.01)
*H04L 29/06* (2006.01)
(Continued)

(52) U.S. Cl.
CPC ............ *G09B 7/02* (2013.01); *G06F 3/011* (2013.01); *G06F 16/24578* (2019.01); *G09B 5/065* (2013.01); *G09B 5/10* (2013.01); *G06F 40/30* (2020.01); *G06N 20/00* (2019.01); *H04L 65/403* (2013.01)

(58) Field of Classification Search
None
See application file for complete search history.

(56) References Cited

U.S. PATENT DOCUMENTS 6,493,690 B2   12/2002   Bertrand et al.
6,658,398 B1   12/2003   Bertrand et al.
(Continued)

OTHER PUBLICATIONS

Lampton D.R., et al., "Instructional Strategies for Training Teams in Virtual Environments", United States Army Research Institute for the Behavioral and Social Sciences, Mar. 2001.
(Continued)

*Primary Examiner* — Nathan Hillery
(74) *Attorney, Agent, or Firm* — Harrity & Harrity, LLP

(57) ABSTRACT

A device may provide, to user devices, a set of objects that are to be used by the user devices as part of a collaborative virtual environment. The collaborative virtual environment may support a virtual workshop. The set of objects may include objects capable of being used to solve a problem that is presented to users within the virtual workshop. The device may receive data describing a set of solutions. The device may curate the data describing the set of solutions using one or more natural language processing techniques. The device may rank the set of solutions that has been curated using a ranking technique or a machine learning technique. The device may provide data identifying a highest ranked solution or data identifying the set of solutions for display within the virtual workshop or to additional user devices that are accessible outside of the virtual workshop.

20 Claims, 7 Drawing Sheets

(51) Int. Cl.
*G06N 20/00* (2019.01)
*G06F 40/30* (2020.01)

(56) References Cited

U.S. PATENT DOCUMENTS

| | | | |
|---|---|---|---|
| 2002/0069189 A1* | 6/2002 | Bertrand | G09B 7/04 706/45 |
| 2004/0186743 A1 | 9/2004 | Cordero | |
| 2006/0147882 A1* | 7/2006 | Sambucetti | G09B 19/00 434/219 |
| 2006/0240394 A1 | 10/2006 | Smith et al. | |
| 2015/0154291 A1 | 6/2015 | Shepherd et al. | |
| 2016/0133230 A1 | 5/2016 | Daniels et al. | |
| 2017/0255893 A1* | 9/2017 | Murai | G06Q 10/1053 |
| 2018/0322254 A1 | 11/2018 | Smurro | |
| 2019/0213550 A1* | 7/2019 | Karadayi | H04N 7/15 |

OTHER PUBLICATIONS

Muller N, et al., "Learning Mechanical Engineering in a Virtual Workshop: A Preliminary Study on Utilisability, Utility Acceptability", DOI:10.1109/VS-GAMES.2017.8055811, 2017, 8 pages.

* cited by examiner

COLLABORATIVE VIRTUAL ENVIRONMENT

BACKGROUND

Virtual reality (VR) may refer to computer technologies that use software to generate realistic images, sounds, and other sensations that replicate a real environment (or create an imaginary setting), and simulate a user's physical presence in the environment. VR may be defined as a realistic and immersive simulation of a three-dimensional environment, created using interactive software and hardware, and experienced or controlled by movement of a user's body. For example, in a VR environment, a person using special electronic equipment, such as a helmet with a display inside, goggles with a display inside, or the like, may interact with a computer-generated simulation of a three-dimensional image or environment in a seemingly real or physical way.

SUMMARY

According to some possible implementations, a device may provide, to a plurality of user devices, a set of objects that are to be used by the plurality of user devices as part of a collaborative virtual environment. The collaborative virtual environment may be used to support a virtual workshop that is a virtual reality and/or augmented reality representation of an in-person workshop. The set of objects may include objects capable of being used to solve a problem that is presented to users within the virtual workshop. The device may receive, from the plurality of user devices, data associated with the virtual workshop. The data may include data describing a set of solutions and data describing user feedback relating to the set of solutions. The device may curate the data associated with the virtual workshop using one or more natural language processing techniques. The device may rank the set of solutions that has been curated using a ranking technique or a data model. The device may provide data identifying a highest ranked solution or data identifying the set of solutions for display within the virtual workshop and to one or more additional user devices that are accessible outside of the virtual workshop.

According to some possible implementations, a non-transitory computer-readable medium may store one or more instructions that, when executed by one or more processors, cause the one or more processors to receive, from a plurality of user devices, requests to access a collaborative virtual environment that is to be used for a virtual workshop. The requests may include a workshop identifier associated with the virtual workshop. The virtual workshop may be a virtual reality and/or augmented reality representation of an in-person workshop. The one more instructions may cause the one or more processors to obtain a set of objects to use within the collaborative virtual environment using the workshop identifier associated with the virtual workshop. The set of objects may include objects capable of being used to solve a problem that is presented to users within the virtual workshop. The one more instructions may cause the one or more processors to provide the set of objects to the plurality of user devices to allow the plurality of user devices to display the set of objects within the virtual workshop. The one more instructions may cause the one or more processors to receive, from the plurality of user devices, data associated with the virtual workshop. The data may include data describing a set of solutions and/or data describing user feedback relating to the set of solutions. The one more instructions may cause the one or more processors to curate the data associated with the virtual workshop using one or more natural language processing techniques. The one more instructions may cause the one or more processors to rank the set of solutions, that has been curated, using a ranking technique or a data model. The one more instructions may cause the one or more processors to provide data identifying a highest ranked solution or data identifying the set of solutions that has been ranked to one or more of the plurality of user devices and/or additional user devices that are accessible to users participating in the virtual workshop.

According to some possible implementations, a method may include providing, by a device and to a plurality of user devices, a set of objects that are to be used by the plurality of user devices as part of a collaborative virtual environment. The collaborative virtual environment may support a virtual workshop that is a virtual reality and/or augmented reality representation of an in-person workshop. The set of objects may include objects capable of being used to solve a problem that is presented to users within the collaborative virtual environment. The method may include receiving, by the device and from the plurality of user devices, data describing a set of solutions. The method may include curating, by the device, the data describing the set of solutions using one or more natural language processing techniques. The method may include ranking, by the device, the set of solutions that has been curated using a ranking technique or a machine learning technique. The method may include providing, by the device, data identifying a highest ranked solution or data identifying the set of solutions for display within the virtual workshop or to one or more additional user devices that are accessible outside of the virtual workshop.

DETAILED DESCRIPTION

Figure 1A:
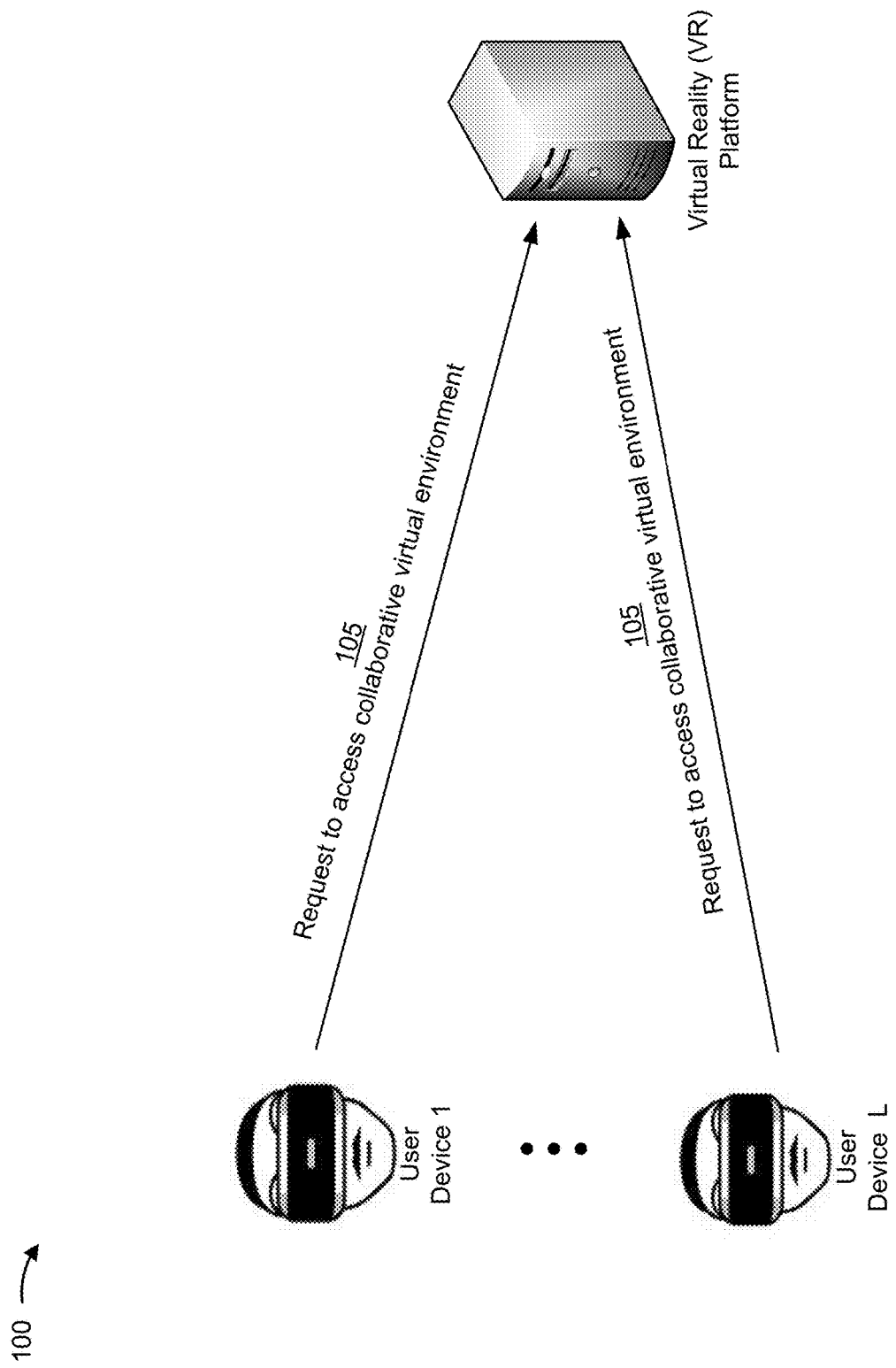
FIGS. 1A-1D are diagrams of an overview of an example implementation described herein.

The following detailed description of example implementations refers to the accompanying drawings. The same reference numbers in different drawings may identify the same or similar elements.

Social collaboration may refer to processes that help a group of people interact and share information to achieve common goals. Enterprise collaboration may refer to processes that help employees of an enterprise to interact and share information to achieve common goals. For example, employees of an enterprise may share information and solutions using in-person workshops, in-person brainstorming sessions, and/or the like.

In-person workshops may be an effective mode of sharing information and solutions, but may not be possible when participants of the workshops are in different geographic areas. Furthermore, while remote meeting applications and/or conference systems allow users to communicate while in different geographic areas (e.g., via a phone call, a video call, etc.), the remote meeting applications and/or conference systems may not be personalized enough to allow for effective collaboration, may not provide tools needed for effective collaboration, and/or the like.

Social virtual reality (VR) may refer to a virtual experience developed for the purpose of social interaction. For example, social VR may provide users with a virtual environment for playing games, engaging in social interactions with other users, and/or the like.

However, VR applications that offer a social virtual experience are not suitable for enterprise uses. For example, a VR application that offers a social virtual experience may include avatars (i.e., virtual depictions of humans or characters within a virtual environment) that allow users to communicate with each other within a virtual environment. However, limitations associated with the VR application may retract from the quality of collaboration that users are able to engage in while within the virtual environment. For example, the VR application may have poor resolution, may include errors (i.e., bugs) that cause avatars to be poorly displayed within the virtual environment, may include avatars whose facial movements do not accurately or closely track those of a user that is interacting with VR equipment, may not provide a mechanism for integration of external data into the virtual environment, may not provide additional features that are able to enhance a collaborative experience, and/or the like.

Some implementations described herein provide a VR platform to support a collaborative virtual environment that is capable of hosting a virtual workshop, where the VR platform is to intelligently rank solutions that are identified during the virtual workshop. For example, the VR platform may receive, from a group of user devices (e.g., devices that support VR, such as VR headsets), requests to access a collaborative virtual environment that is to be used for a virtual workshop. In this case, the VR platform may obtain a set of objects to use within the virtual workshop. The set of objects may be capable of being used to solve a problem that is presented to the users as part of the virtual workshop. The VR platform may provide the set of objects to group of user devices to allow the group of user devices to display the set of objects within the virtual workshop.

Additionally, the VR platform may receive, from the group user devices, data associated with user interactions within the virtual workshop. For example, users within the collaborative virtual environment may think of solutions, and may submit the solutions to the VR platform. Furthermore, the users may provide user feedback to comment on the solutions, and may submit the user feedback to the VR platform.

In this case, the VR platform may curate the data associated with the user interactions within the virtual workshop. For example, to be able to further analyze the solutions and the user feedback, the VR platform may need to curate the data by converting the data into a uniform format, by annotating the data in a manner that allows the set of solutions to be ranked (e.g., to identify a best available solution), and/or the like.

Additionally, the VR platform may rank the solutions that have been curated using a ranking technique and/or a machine learning technique. Furthermore, the VR platform may provide a top ranked solution or a set of ranked solutions for display within the virtual workshop. In some cases, the VR platform may provide additional services within the virtual workshop, such as supplemental objects, plans to implement proposed solutions, prototypes of solutions, and/or the like.

In this way, the VR platform is able to intelligently orchestrate a virtual workshop for a group of users. Furthermore, by providing additional services to supplement the virtual workshop (e.g., by providing objects tailored to the virtual workshop, by automatically ranking the solutions, etc.), the VR platform reduces a utilization of resources (e.g., processing resources, network resources, etc.) needed to complete the virtual workshop.

For example, without providing objects tailored to the virtual workshop (e.g., a virtual representation of a product being modified, a prototype that is to be further developed, a real-time summary of solutions and user feedback, etc.), the users may spend more time brainstorming within the virtual workshop, may take longer to come up with solutions, and/or the like, which may require the group of user devices to utilize resources that would not be needed if the users were able to more efficiently select and identify solutions during the virtual workshop. As another example, without a service to automatically rank the solutions, the users may need to engage in further collaboration to determine which solution to select, and why, and the further collaboration may require the group of user devices to utilize resources that are not needed in a collaborative virtual environment that automatically ranks the solutions.

FIGS. 1A-1D are diagrams of an overview of an example implementation 100 described herein. As shown in FIGS. 1A-D, example implementation 100 may include a virtual reality (VR) platform that supports a collaborative virtual environment for hosting a virtual workshop. In this case, a group of users may, using a group of user devices with VR capabilities (shown as User Device 1 through User Device L), access the collaborative virtual environment to participate in the virtual workshop. Additionally, it is to be understood that the collaborative virtual environment supported by the VR platform is capable of utilizing VR, augmented reality (AR), mixed reality (MR), and/or some combination thereof.

As shown in FIG. 1A, and by reference number 105, the group of user devices may provide, to the VR platform, requests to access the collaborative virtual environment. For example, the group of user devices may request to access the collaborative virtual environment to participate in the virtual workshop. The virtual workshop may be a workshop for generating solutions to a particular problem (e.g., a six sigma lean assessment workshop), a workshop for generating implementation solutions relating to strategies for implementing a particular solution (e.g., a design thinking assessment workshop), and/or the like. The requests may include a workshop identifier (ID) and a user ID. The workshop ID may identify the virtual workshop and the user ID may identify a particular user that is to access the virtual workshop.

As an example, assume the group of users include a group leader and a team of employees. In this example, the group leader may use a first user device to provide a request to access the collaborative virtual environment. The request may include the workshop ID and a user ID associated with the group leader. Additionally, the team of employees may use additional user devices to provide requests to access the collaborative virtual environment, and the requests may include the workshop ID and user IDs associated with the team of employees.

In this way, the group of user devices are able to request to access the collaborative virtual environment.

Figure 1B:
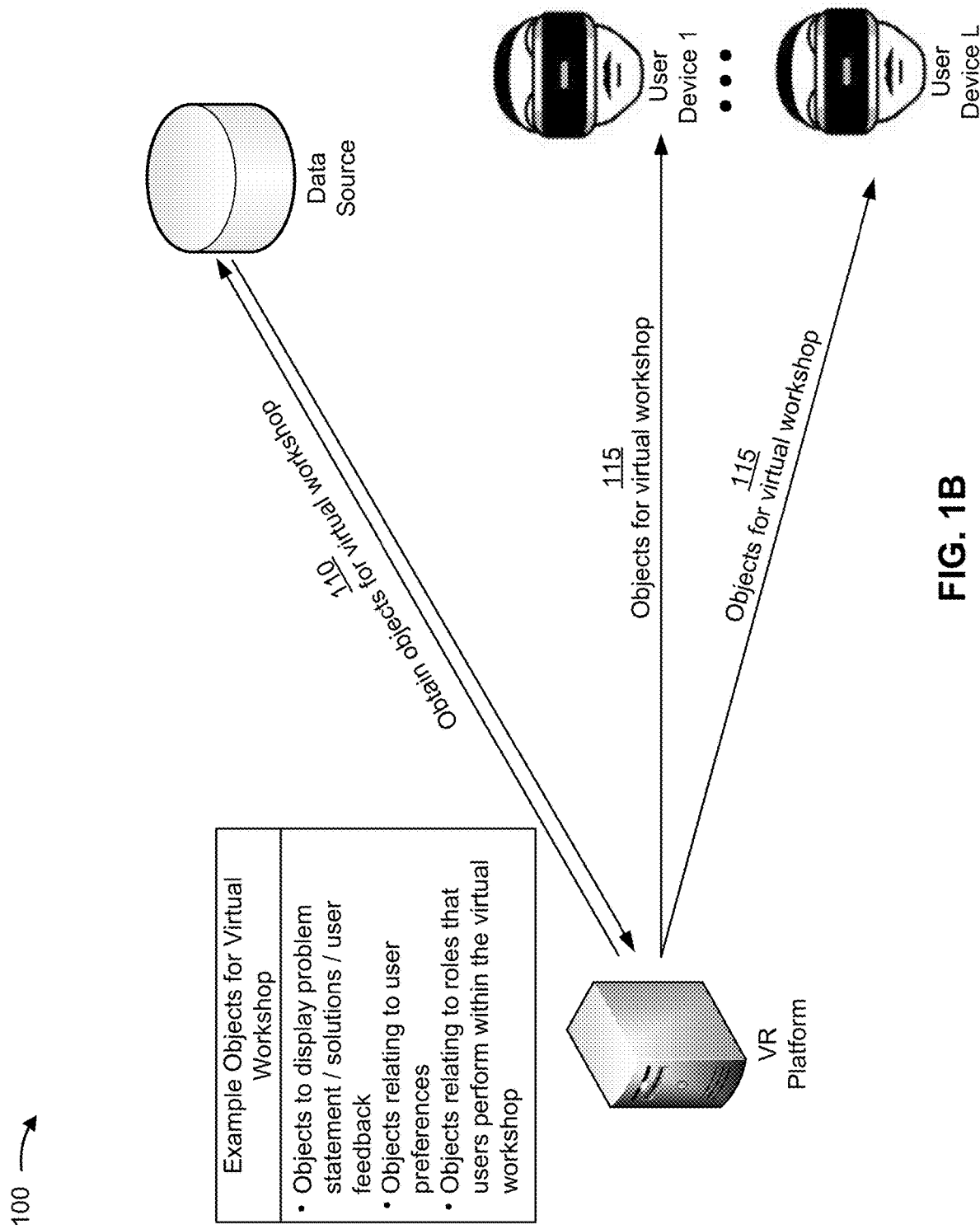

As shown in FIG. 1B, and by reference number 110, the VR platform may obtain, from a data source, a set of objects for the virtual workshop that is hosted within the collaborative virtual environment. For example, the VR platform may use the workshop ID and the user IDs to obtain a set of objects for the virtual workshop. In this case, the set of objects may be stored by the data source (e.g., a data source external to the VR platform, a data source within the VR platform, etc.), and the VR platform may use the workshop ID and the user IDs to obtain (e.g., query) the set of objects.

The set of objects may include one or more objects associated with the virtual workshop and/or one or more objects associated with the group of users. For example, the one or more objects associated with the virtual workshop may include an object to display a description of the problem that is to be solved (e.g., a virtual whiteboard), an object to display a product or a prototype that is to be discussed during the virtual workshop, an object to display a possible solution to the problem and/or to display user feedback relating to the solution (e.g., the virtual whiteboard, a virtual sticky note, a virtual notebook, etc.), an object displaying a menu that allows users to create additional objects during the virtual workshop, and/or the like. Additionally, or alternatively, the one or more objects associated with the group of users may include an object relating to a user preference (e.g., a preferred object to use when displaying the information, a preferred language to be used for text displayed on the preferred object, etc.), an object relating to a role that a particular user is to play within the virtual workshop (e.g., an object available to a group leader may not be available to the rest of the users, etc.), and/or the like.

In some implementations, the data source may store historical data relating to other virtual workshops. For example, the data source may store historical data that includes data describing problems addressed in previous virtual workshops, data describing solutions for problems addressed in the previous virtual workshops, data describing user feedback to the problems addressed in the previous virtual workshops, and/or the like. In some cases, the data source may store the historical data in a manner that allows the historical data to be used to support the virtual workshop that is presently being hosted. For example, if the virtual workshop is to solve a problem relating to a particular product, the VR platform may be able to obtain historical data of solutions to problems that relate to the same product, historical data of solutions to the same or similar problems as applied to different products, and/or the like. In some cases, the VR platform may use the historical data to train machine learning models, as described further herein.

As shown by reference number 115, the VR platform may provide the set of objects for the virtual workshop to the group of user devices. In this way, the group of user devices to able to use the set of objects within the virtual workshop, as described further herein.

Figure 1C:
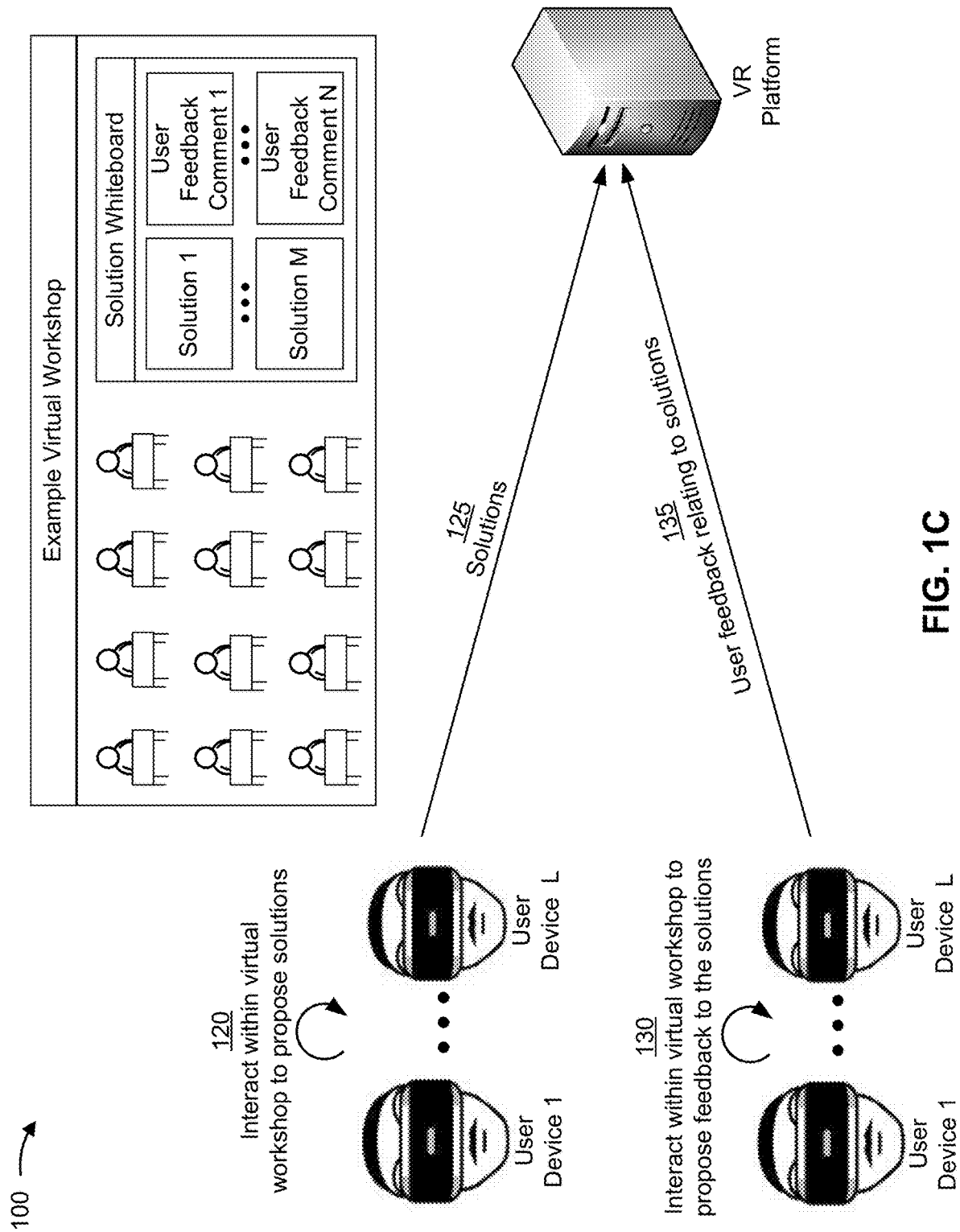

As shown in FIG. 1C, and by reference number 120, a group of users may interact within the virtual workshop to propose a set of solutions. For example, a user may be represented within the virtual workshop using an avatar, and may use the avatar to propose a solution to the problem that the users are tasked with solving during the virtual workshop. The user may propose the solution by writing the solution onto an object (e.g., a virtual whiteboard, a virtual sticky note, a virtual notepad, etc.), by making an oral statement describing the solution, by using hand motions to describe one or more aspects of the solution, and/or the like. The user may propose the solution by proposing an overview of the solution, an estimated time to implement the solution, an estimated cost of the solution, a strength of the solution, a weakness of the solution, and/or any other information that the user can think of that may help the group of users to evaluate the solution.

As shown by reference number 125, data describing the set of solutions may be received by the VR platform. For example, if a user proposes a solution by writing the solution onto a virtual whiteboard, text data and/or image data describing the solution may be received by the VR platform. As another example, if the user proposes a solution by making an oral statement, audio data describing the solution may be received by the VR platform. As another example, if the user proposes a solution by writing the solution on the virtual whiteboard and by making an oral statement, multimedia data may be received by the VR platform.

In some implementations, the VR platform may identify that received data describes a solution (as opposed to user feedback to a solution) based a particular time period at which the data is received. For example, the virtual workshop may have a set time period that allows users to come up with ideas, and may have a separate time period that allows users to provide feedback to the ideas. In this way, the VR platform is able to differentiate between data describing a solution and data describing user feedback.

Additionally, or alternatively, the VR platform may identify that received data describes a solution (as opposed to user feedback to a solution, a question, or some other interaction) based on a property of an object within the virtual workshop. For example, the virtual workshop may include a particular virtual whiteboard that is dedicated to solutions (and not to feedback of the solutions, questions relating to solutions, etc.), and the received data may be associated with an identifier of the particular virtual whiteboard. As another example, an object that appears before a user in the virtual workshop (e.g., the virtual whiteboard, another type of object, etc.) may allow the user to categorize the statement they are providing (e.g., by indicating that the statement is a solution, feedback to a solution, a question, etc.).

Additionally, or alternatively, the VR platform may automatically determine that the received data describes a solution. For example, the VR platform may execute a natural language processing technique to compare the received data to data describing the problem that is to be solved, and may determine that the received data describes a solution based on a degree of similarity between the received data and the data describing the problem. Additionally, or alternatively, the VR platform may determine that the received data describes a solution using one or more additional factors, such as whether the data includes questions (e.g., which may be an indicator of someone asking a question, rather than providing a solution), whether the data includes qualifying statements (e.g., feedback of an idea may include qualifying statements that would not be included in a solution, such as statements beginning with "I agree with idea X because . . . ," "I disagree with idea X because . . . ,"), and/or the like.

As shown by reference number 130, the group of user devices may interact within the virtual workshop to propose feedback relating to the set of solutions. For example, after the group of users submit solutions and/or while the group of users are submitting solutions, the group of users may be permitted to analyze each other's solutions and to provide feedback relating to the solutions.

As shown by reference number 135, data describing the user feedback may be provided to the VR platform in the same manner described above. Additionally, the VR platform may be able to identify received data as data describing user feedback in the same manner described above.

In some implementations, one or more users may update solutions and/or user feedback within the virtual workshop. For example, a user may interact with the virtual whiteboard to update a solution that has already been provided to the VR platform. In this case, the VR platform may identify received data as being associated with an existing solution that is to be updated based on an identifier that is associated with the received data.

As an example, if a virtual whiteboard is used to record multiple solutions, different portions of the virtual whiteboard may be reserved for different solutions, and each portion of the virtual whiteboard may be associated with an identifier of the solutions. As another example, if the user had interacted with an object to categorize the statement that was being provided was a solution, the user may also interact with the object to categorize the statement being provided is an update to the solution.

In some implementations, users may request additional objects during the virtual workshop. For example, if a user is trying to think of a solution to a problem, the user may request (e.g., in writing, by making an oral request, etc.) any supplement item available in the real world. As an example, assume the user is trying to think of a new design for an automotive part. In this case, the user may request that a virtual representation of an automobile or the automotive part be placed into the virtual workshop.

To satisfy the request, the VR platform may perform a search of a data source (e.g., using a web browser, an application, etc.) to identify data that may be used for generating the virtual representation of the automobile or the automotive part. For example, if the request made by user within the virtual workshop is text-based, the VR platform may use a natural language processing technique to generate a query, based on the text-based request, and may use the query to identify an image of the automobile or the automotive part. If the request is audio-based, the VR platform may convert the audio to text, and may generate a query, based on the text, and may use the query to identify an image of the automobile or the automotive part. If the request is image-based, the VR platform may use an image search technique to identify a similar image.

After the VR platform identifies data that may be used to satisfy the request, the VR platform may use the data to generate the virtual representation of the automobile or the automotive part. For example, the VR platform may use a scanning technique to scan the image identifying the automobile vehicle or the automotive part, and may generate one or more additional objects that provide a virtual (possibly 3 dimensional) representation of the automobile or the automotive part. In some cases, the data source may already store virtualized representations of items that may be requested by user devices (e.g., the automobile or the automotive part). In this case, rather than process images needed to generate the objects, the VR platform may simply query the data source to obtain the objects.

In this way, the VR platform is able to receive and process data that is provided as part of the virtual workshop.

Figure 1D:
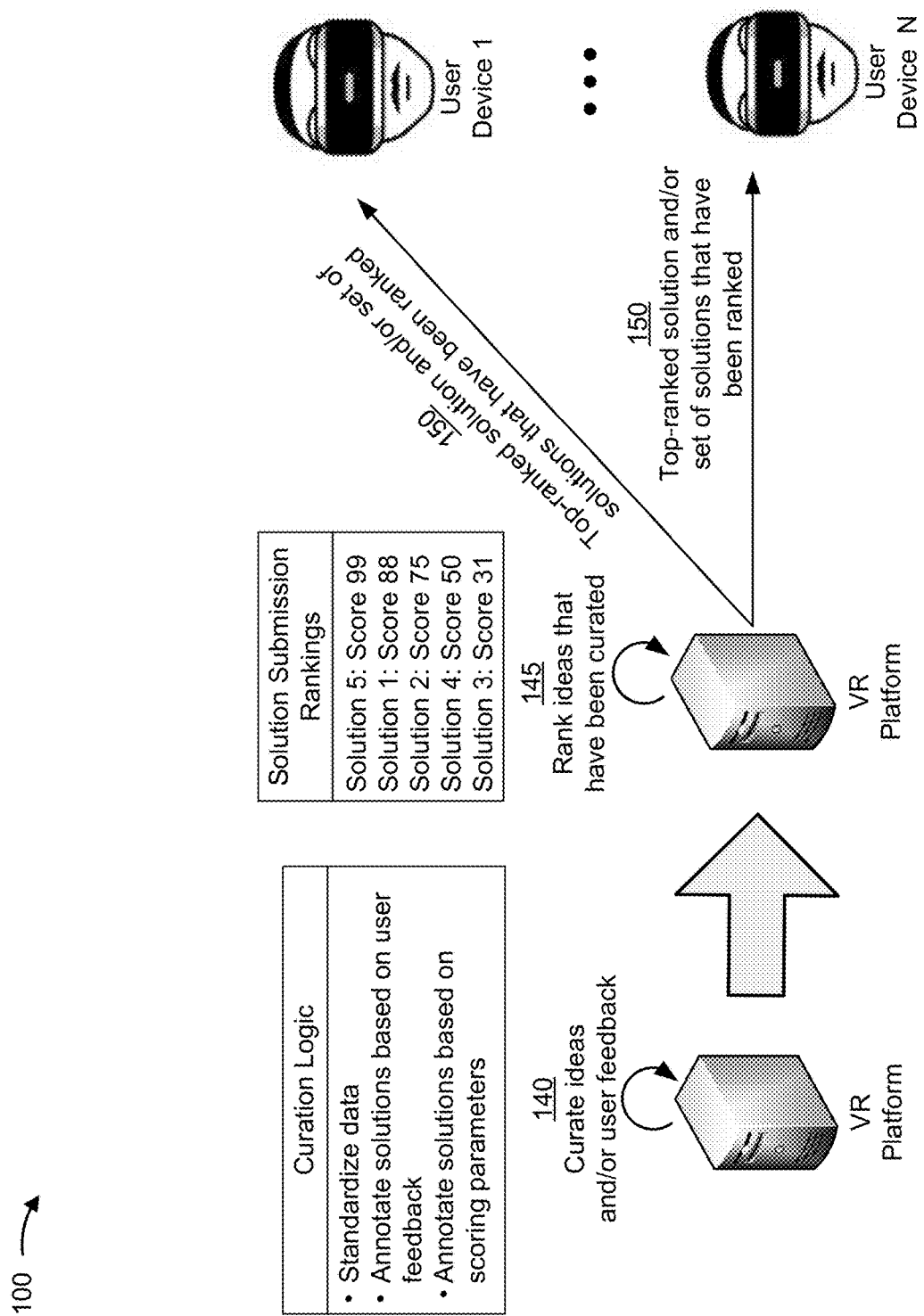

As shown in FIG. 1D, and by reference number 140, the VR platform may curate the data associated with the virtual workshop. For example, to be able to further analyze the solutions and the user feedback, the VR platform may need to curate the data by converting the data into a uniform format, by annotating the data in a manner that allows the set of solutions to be ranked (e.g., to identify a best available solution), and/or the like, as described below.

In some implementations, the VR platform may convert the data associated with the virtual workshop into a uniform format. For example, the data associated with the virtual workshop may be associated with different file types, different file formats, different data types, different languages, and/or the like, and the VR platform may apply one or more conversion techniques to convert the data into a uniform format. In some cases, the VR platform may apply different conversion techniques to different file types, file formats, data types, and/or languages.

In some implementations, the VR platform may annotate the data describing the set of solutions using the data describing the user feedback. For example, as users within the virtual workshop analyze and/or critique each other's solutions, positive user feedback and/or negative user feedback may be received by the VR platform. In this case, the VR platform may annotate the data describing the set of solutions such that each solution is associated with positive user feedback and/or negative user feedback that was provided for the solution.

In some implementations, the data describing the set of solutions may be automatically annotated with the data describing the user feedback. For example, if the user is provided with an object that requires the user to indicate to which solution the feedback applies, whether the feedback is positive or negative, and/or the like, the VR platform may automatically annotate the data for that particular solution with the data describing the user feedback.

In some implementations, the VR platform may annotate the data describing the set of solutions using one or more natural language processing techniques. For example, the VR platform may use a first natural language processing technique to identify to which solution the user feedback applies, and/or may use a second natural language processing technique to determine whether the user feedback is positive or negative. In this case, the VR platform may execute the first natural language processing technique to identify keywords that may indicate that the user feedback is directed toward a particular solution. For example, the user feedback may include keywords that explicitly identify a particular solution that is being described, may mention properties or characteristics that are only found in the particular solution, and/or the like.

Additionally, the VR platform may execute the second natural language processing technique to determine whether the user feedback is positive or negative. For example, the VR platform may execute a sentiment analysis technique to determine a polarity score associated with user feedback, and may mark the user feedback as positive feedback or negative feedback based on the polarity score. As an example, assume the VR platform uses the sentiment analysis technique to identify phrases such as "I strongly disagree with solution X," "I really like solution X," "Solution X is okay, but one issue I have . . . ," and/or the like. In this example, each phrase may be assigned a positive polarity score or a negative polarity score, and that polarity score may be used to classify the user feedback as positive or negative.

Additionally, or alternatively, the VR platform may annotate the set of solutions based on a set of scoring parameters. For example, the VR platform may be configured with a set of scoring parameters that may be used to automatically determine a strength or degree of relevance of a particular solution to the problem that the users are tasked with solving. The set of scoring parameters may include a parameter indicating a time range in which a solution is to be implemented, a parameter indicating a cost range associated with implementing the solution, a parameter indicating a degree of difficulty associated with implementing the solution, a parameter indicating a risk associated with the particular solution, and/or the like. In this case, the VR platform may use a natural language processing technique to identify particular statements within a solution, and may compare the particular statements to the scoring parameters to determine a strength or degree of relevancy of the solution.

As shown by reference number 145, the VR platform may rank the set of solutions that has been curated. In some implementations, the VR platform may rank the set of solutions based on a user vote. For example, each user may vote within the virtual workshop on which solution is a preferred or best-available solution, and the VR platform may automatically tally the votes. In this case, the VR platform may display a result of the vote within the virtual workshop. In some cases, the VR platform may provide a real-time update on a current vote count as each user submits a vote.

In some implementations, the VR platform may rank the set of solutions using a ranking technique. For example, the VR platform may rank the set of solutions by executing a ranking technique that is based on the set of annotations associated with the user feedback, a ranking technique that is based on the set of annotations associated with the scoring parameters, and/or the like. The ranking technique may be a nominal group technique (NGT), a multi-voting technique, a probability distribution technique, and/or a similar type of technique.

As an example, the VR platform may rank the set of solutions based on the user feedback. In this example, each solution may be associated with positive feedback and/or negative feedback, and the VR platform may execute a ranking technique that assigns scores to solutions based on an amount of positive feedback, an amount of negative feedback, a degree to which feedback is positive or negative, and/or the like.

As another example, the VR platform may rank the set of solutions based on the scoring parameters. As a particular example, a set of scoring parameters may indicate that a preferred time of implementation for solutions is 0-4 months, that a preferred cost of solutions is less than a million dollars, and/or the like. In this example, if a first solution will take a year to implement, and cost two million dollars, and a second solution will take three months to implement, and cost half a million dollars, the second solution may receive better (e.g., lower) scores than the first solution.

In some implementations, the VR platform may rank the set of solutions using a machine learning technique. For example, the VR platform may train a data model (often referred to as a machine learning model) on historical data relating to virtual workshops that were previously hosted within the collaborative virtual environment. The historical data may include historical data describing problems that were discussed in other virtual workshops, historical data describing a product or a service to which the problem relates, historical data describing solutions to solve the problems that were discussed in the other virtual workshops, historical data describing user feedback for the solutions presented in the other virtual workshops, historical data describing how the solutions were scored, historical data describing which solutions were selected, historical data indicating whether implemented solutions were successful, and/or the like. In this case, the VR platform may provide the data describing the solutions and/or the data describing the user feedback as input to the data model to cause the data model to output a set of values that may be used to rank the set of solutions.

In some cases, the data model may also output values relating to historical solutions that were submitted by previous users that participated in other virtual workshops. For example, if a particular historical solution relates to the problem that the virtual workshop is trying to address, the data model may score the particular historical solution, and include the score in the set of values that are output.

As shown by reference number 150, the VR platform may provide a top-ranked solution and/or the set of solutions that has been ranked for display within the virtual workshop. Additionally, or alternatively, the VR platform may provide the top-ranked solution and/or the set of solutions that has been ranked to one or more additional devices (e.g., additional user devices, server devices, etc.) that are accessible outside of the virtual workshop. For example, the VR platform may provide the top-ranked solution and/or the set of solutions that has been ranked to a server device that supports a web interface for displaying information relating to the virtual workshop. In this case, the group of users may be able to use additional user devices to access the web interface to view the top-ranked solution and/or the set of solutions that has been ranked.

In some implementations, after a particular solution has been selected as a solution that is to be implemented, the VR platform may perform one or more additional actions to orchestrate selection of a way to implement the particular solution. For example, the VR platform may provide one or more additional objects for display within the virtual workshop (or as part of a new virtual workshop dedicated to identifying a best way to implement the particular solution). In this case, the VR platform may receive, from the group of user devices, data describing a set of implementation solutions and/or data describing user feedback relating to the set of implementation solutions.

Additionally, the VR platform may curate the data describing the set of implementation solutions and/or the data describing the user feedback relating to the set of implementation solutions, in the same manner described above. Furthermore, the VR platform may rank the set of implementation solutions, in the same manner described above. Moreover, the VR platform may provide data identifying a top ranked implementation solution or data identifying the set of implementation solutions within the virtual workshop (or the new virtual workshop). Additionally, or alternatively, the VR platform may provide data identifying the top ranked implementation solution or the data identifying the set of implementation solutions to one or more additional devices that are outside of the virtual workshop (or the new virtual workshop).

In some implementations, after the particular solution is selected as a solution to be implemented, the VR platform may generate one or more additional objects that describe an implementation plan for the particular solution, one or more additional objects of a prototype depicting an implementation of the particular solution, and/or the like. In this case, the VR platform may provide the one or more additional objects for display within the virtual workshop (or the new virtual workshop).

As an example, the VR platform may generate one or more additional objects that describe an implementation plan for the particular solution. For example, the VR platform may obtain information relating to processes of an organization that is to implement the particular solution, such as schedules of employees, schedules and availability of machines and tools needed to implement the particular solution, information of third parties that may be needed to help implement the particular solution, and/or the like. In this case, the VR platform may process the particular solution and the information relating to the processes of the organization to generate the one or more additional objects that describe an implementation plan for the particular solution.

In some cases, the VR platform may automatically execute the implementation plan. For example, the VR platform may automatically schedule a technician to begin working on a product, may automatically schedule a machine or a tool to begin working on a product, may automatically populate a work order to request a third party to begin working on a product, and/or the like.

As another example, the VR platform may generate one or more additional objects of a prototype depicting an implementation of the particular solution. For example, if the particular solution is to modify a particular product or to add a feature to the particular product, the VR platform may generate one or more additional objects that are capable of providing users within the virtual workshop (or the new virtual workshop) with a graphical representation of the modification or added feature of the particular product. As another example, if the particular solution involves a process that may be carried out by one or more users and/or machines or tools, the VR platform may generate one or more additional objects that enable the users to use the virtual workshop to role play the process that would be carried out to implement the particular solution.

In some cases, the VR platform may automatically instruct another device to create a real world version of the prototype. For example, the VR platform may instruct another device to begin building the prototype, may instruct a 3 dimensional (3-D) printer to create a 3-D representation of the prototype, and/or the like.

In this way, the VR platform is able to intelligently orchestrate a virtual workshop for a group of users. Furthermore, by providing additional services to supplement the virtual workshop (e.g., by providing objects tailored to the virtual workshop, by automatically ranking the solutions, etc.), the VR platform reduces a utilization of resources (e.g., processing resources, network resources, etc.) needed to complete the virtual workshop.

As indicated above, FIGS. 1A-1D are provided merely as an example. Other examples are possible and may differ from what was described with regard to FIGS. 1A-1D. For example, there can be additional devices and/or networks, fewer devices and/or networks, different devices and/or networks, or differently arranged devices and/or networks than those shown in FIGS. 1A-1D. Furthermore, two or more devices shown in FIGS. 1A-1D can be implemented within a single device, or a single device shown in FIGS. 1A-1D can be implemented as multiple, distributed devices. Additionally, or alternatively, a set of devices (e.g., one or more devices) of example implementation 100 can perform one or more functions described as being performed by another set of devices of example implementation 100.

Figure 2:
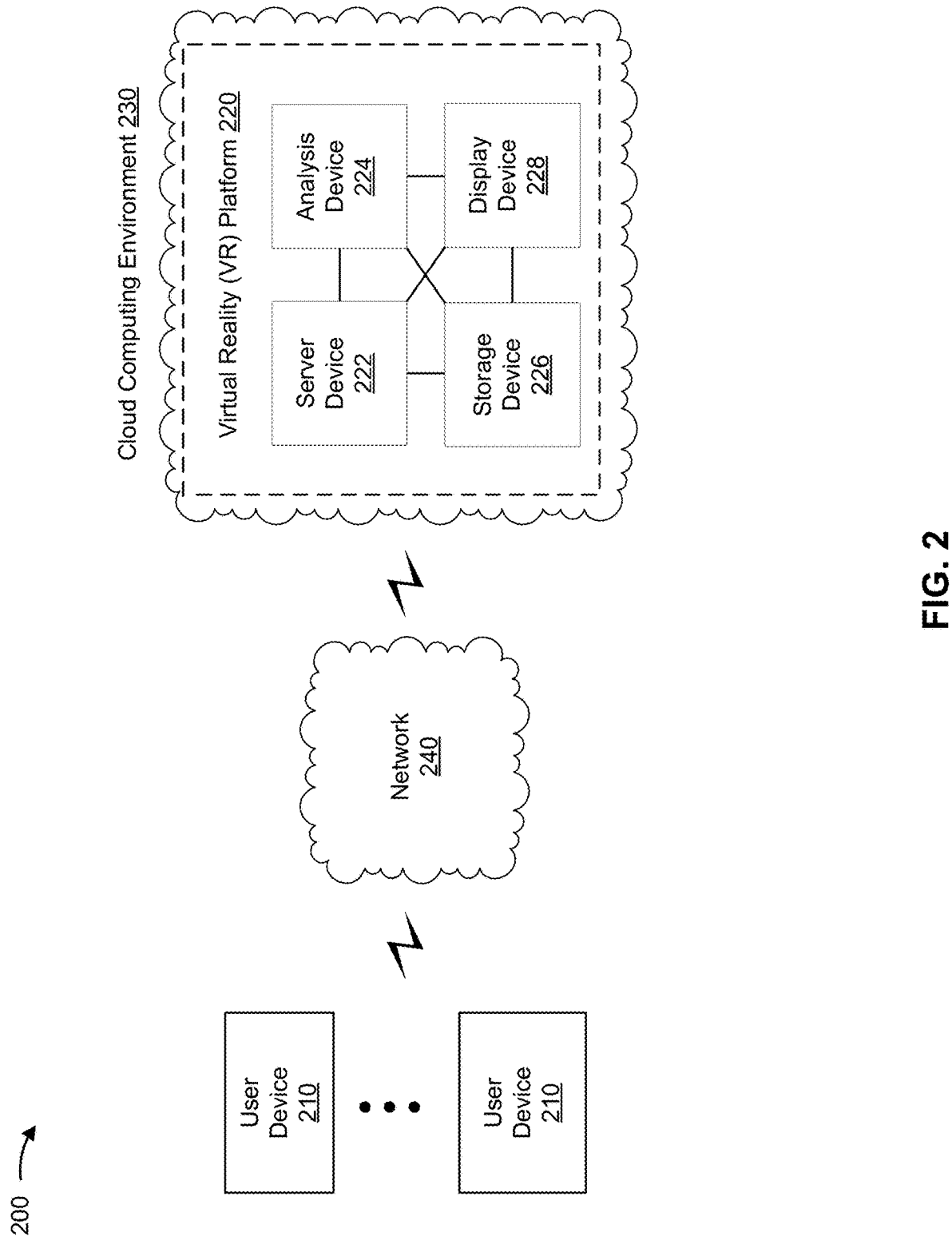
FIG. 2 is a diagram of an example environment in which systems and/or methods, described herein, may be implemented.

FIG. 2 is a diagram of an example environment in which systems and/or methods, described herein, may be implemented. As shown in FIG. 2, environment 200 may include one or more user device(s) 210, a virtual reality (VR) platform 220 hosted in a cloud computing environment 230, and/or a network 240. Devices of environment 200 may interconnect via wired connections, wireless connections, or a combination of wired and wireless connections.

User device 210 includes one or more devices capable of receiving, generating, storing, processing, and/or providing information associated with a collaborative virtual environment. For example, user device 210 may include a communication and computing device, such as a mobile phone (e.g., a smart phone, a radiotelephone, etc.), a laptop computer, a tablet computer, a handheld computer, a wearable communication device (e.g., a virtual reality headset, a pair of smart eyeglasses, etc.), a virtual reality device, and/or the like. In some implementations, user device 210 may generate and/or provide at least a portion of a VR environment that is generated and/or provided by VR platform 220.

In some implementations, user device 210 may interact with one or more devices in a vicinity around user device 210, such as a phone, a controller (e.g., a joystick), a speaker, a headphone, a mouse, a keyboard, a printer, a monitor, a webcam, a microphone, and/or the like. In some implementations, user device 210 may provide a request to access the collaborative virtual environment to VR platform 220, which may cause VR platform 220 to provide the collaborative virtual environment to user device 210. In some implementations, user device 210 may provide information associated with one or more interactions within the collaborative virtual environment to VR platform 220.

VR platform 220 includes one or more devices capable of receiving, determining, processing, storing, and/or providing information associated with the collaborative virtual environment. For example, VR platform 220 may include a server device (e.g., a host server, a web server, an application server, etc.), a cloud device, a data center device, or a similar device. In some implementations, VR platform 220 may be associated with a VR program that includes a collaborative virtual environment (e.g., an environment in which a group of users may collaborate to brainstorm, think of a new solution, think of a solution to a problem, think of a way to implement the new solution or the solution, and/or the like). The VR program may be a computer program designed to perform a group of coordinated functions, tasks, or activities for the VR platform 220. For example, the VR program may integrate VR platform 220 with a graphical user interface (GUI) of VR platform 220. In some implementations, the VR program may be installed on user device 210.

In some implementations, VR platform 220 may be associated with a GUI. The GUI may allow a user to interact with user device 210 through graphical icons, visual indicators, typed command labels, text navigation, and/or the like. A user may interact with the GUI through direct manipulation of the graphical icons, visual indicators, typed command labels, text navigation, and/or the like.

In some implementations, VR platform 220 may be associated with one or more operating systems (e.g., iOS, Android, and/or the like). In some implementations, VR platform 220 may be associated with application middleware. The application middleware may be a software layer that ties the one or more operating systems and the VR application. The application middleware also may connect software components in VR platform 220. In some implementations, VR platform 220 may be associated with an application programming interface (API) that defines how routines and protocols may be used when the GUI is programmed.

In some implementations, as shown, VR platform 220 may be hosted in cloud computing environment 230. Notably, while implementations described herein describe VR platform 220 as being hosted in cloud computing environment 230, in some implementations, VR platform 220 may not be cloud-based or may be partially cloud-based.

As further shown in FIG. 2, VR platform 220 may include a server device 222, an analysis device 224, a storage device 226, and/or a display device 228. In some implementations, server device 222, analysis device 224, storage device 226, and/or display device 228 may communicate via wired connections, wireless connections, or a combination of wired and wireless connections.

Server device 222 includes one or more devices capable of receiving, collecting, obtaining, gathering, storing, processing, and/or providing information associated with the collaborative virtual environment. For example, server device 222 may include a server device or a group of server devices. In some implementations, server device 222 may be implemented by one or more virtual machines executing on one or more computer devices of cloud computing environment 230. In some implementations, server device 222 may receive a request to access a collaborative virtual environment from user device 210 (e.g., via an API). In some implementations, server device 222 may receive data associated with the virtual workshop. In some implementations, server device 222 may provide the data associated with the virtual workshop to analysis device 224.

Analysis device 224 includes one or more devices capable of receiving, collecting, obtaining, gathering, storing, processing, and/or providing information associated with the collaborative virtual environment. For example, analysis device 224 may include a server device or a group of server devices. In some implementations, analysis device 224 may be implemented by one or more virtual machines executing on one or more computer devices of cloud computing environment 230. In some implementations, analysis device 224 may analyze the data associated with the virtual workshop using one or more natural language processing techniques. In some implementations, analysis device 224 may analyze the data associated with the virtual workshop using a machine learning technique (e.g., using a data model). In some implementations, analysis device 224 may provide the data associated with the virtual workshop, objects or additional objects identified from analyzing the data associated with the virtual workshop, and/or the like, to storage device 226.

Storage device 226 includes one or more devices capable of receiving, collecting, obtaining, gathering, storing, processing, and/or providing information associated with the collaborative virtual environment. For example, storage device 226 may include a server device or a group of server devices. In some implementations, storage device 226 may be implemented by one or more virtual storage devices of cloud computing environment 230. In some implementations, storage device 226 may store data associated with the virtual workshop, data associated with a user profile, data associated with user feedback, historical data, and/or the like. In some implementations, storage device 226 may store content updates provided by a VR platform 220 administrator. For example, storage device 2260 may store content updates that are pushed onto VR platform 220 by another device.

Display device 228 includes one or more devices capable of receiving, collecting, obtaining, gathering, storing, processing, and/or providing information associated with the collaborative virtual environment. For example, display device 228 may include a server device or a group of server devices. In some implementations, display device 228 may be implemented by one or more virtual machines executing on one or more computer devices of cloud computing environment 230. In some implementations, display device 228 may generate an interface (e.g., a web interface) to allow one or more user devices 210 to view solutions generated from the virtual workshop, solutions predicted to be a best-available solution, additional information relating the solutions (e.g., proposals to implement the solutions, plans to implement the solutions, prototype to implement the solutions, etc.), and/or the like.

In some implementations, display device 228 may be hosted outside of VR platform 220. For example, VR platform 220 may support server device 222, analysis device 224, and/or storage device 226, but may not support display device 228. In this case, VR platform 220 and display device 228 may communicate via API to allow VR platform 220 to utilize the functionality provided by display device 228.

Network 240 includes one or more wired and/or wireless networks. For example, network 240 may include a cellular network (e.g., a fifth generation (5G) network, a fourth generation (4G) network, such as a long-term evolution (LTE) network, a third generation (3G) network, a code division multiple access (CDMA) network, another type of advanced generated network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
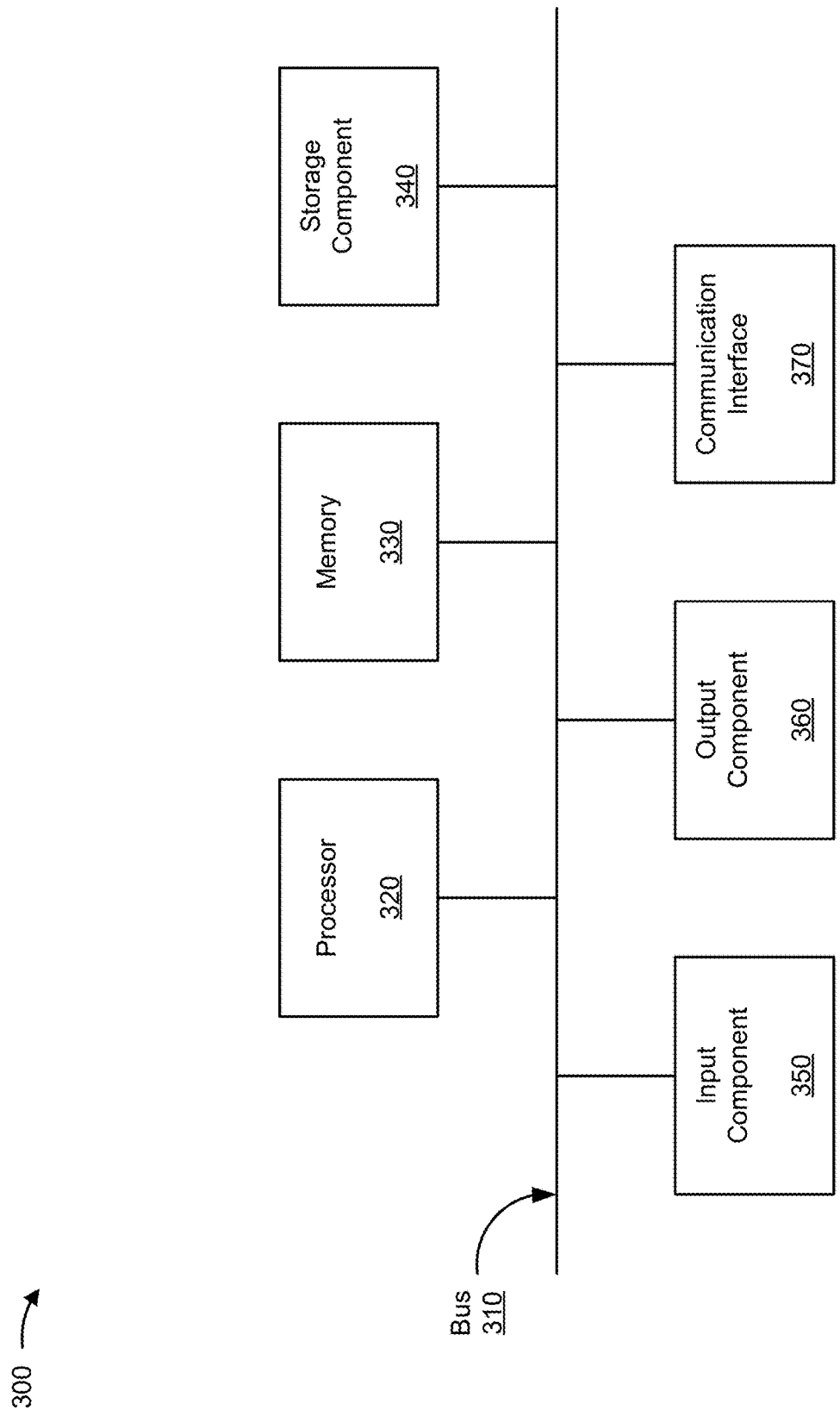
FIG. 3 is a diagram of example components of one or more devices of FIG. 2.

FIG. 3 is a diagram of example components of a device 300. Device 300 may correspond to user device 210, and/or VR platform 220. In some implementations, user device 210, and/or VR platform 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
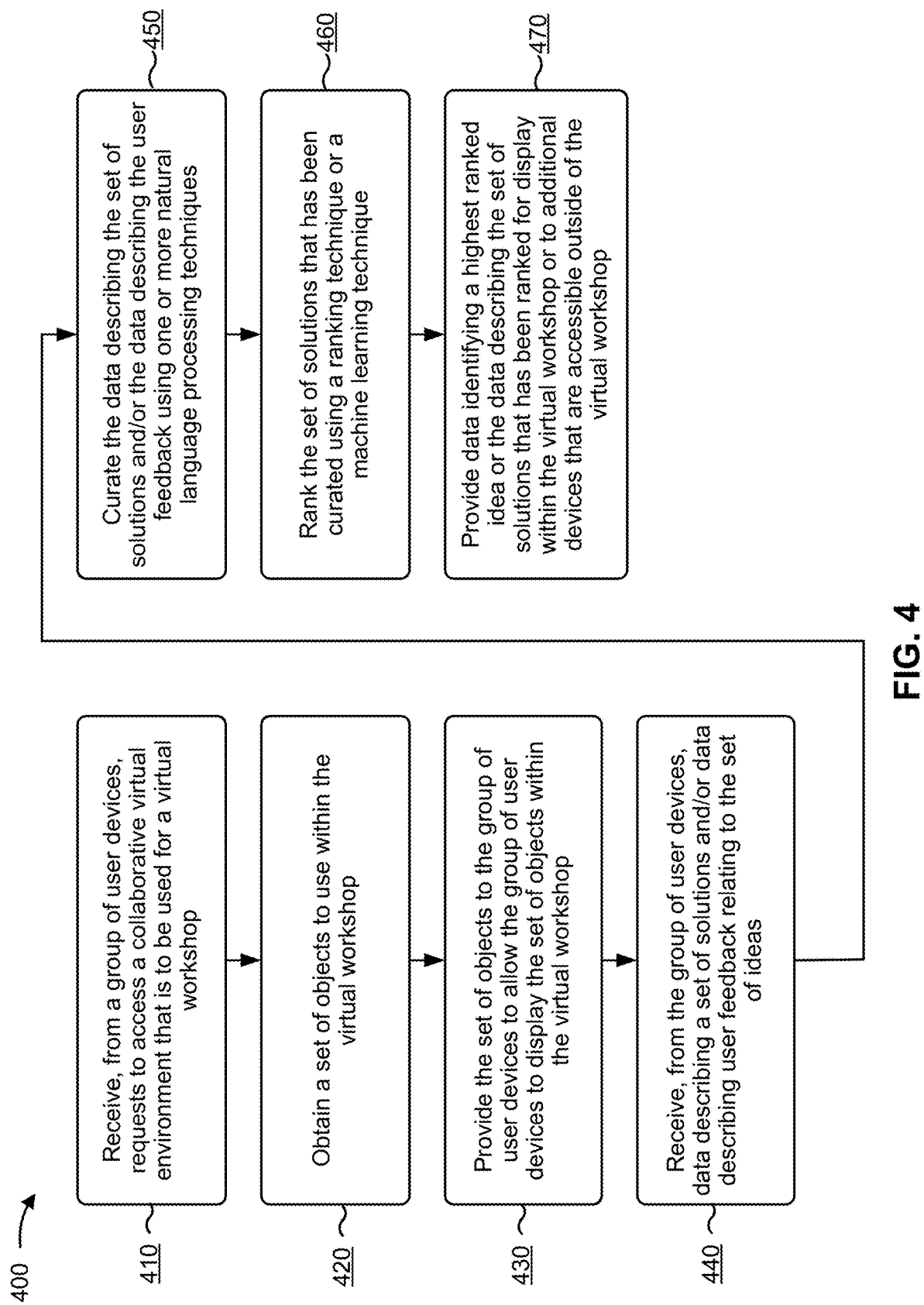
FIG. 4 is a flow chart of an example process for supporting a collaborative virtual environment that hosts a virtual workshop, and for using natural language processing and/or machine learning to rank solutions that are identified during the virtual workshop.

FIG. 4 is a flow chart of an example process 400 for supporting a collaborative virtual environment that hosts a virtual workshop, and for using natural language processing and/or machine learning to rank solutions that are identified during the virtual workshop. In some implementations, one or more process blocks of FIG. 4 may be performed by virtual reality (VR) platform 220. In some implementations, one or more process blocks of FIG. 4 may be performed by another device or a group of devices separate from or including VR platform 220, such as user device 210.

As shown in FIG. 4, process 400 may include receiving, from a group of user devices, requests to access a collaborative virtual environment that is to be used for a virtual workshop (block 410). For example, a virtual reality (VR) platform (e.g., VR platform 220, using server device 222, processor 320, input component 350, etc.) may receive, from a group of user devices (e.g., user devices 210), requests to access a collaborative virtual environment that is to be used for a virtual workshop, as described above in connection with FIGS. 1A-1D. The virtual workshop may be a virtual reality and/or augmented reality representation of an in-person workshop.

As further shown in FIG. 4, process 400 may include obtaining a set of objects to use within the virtual workshop (block 420). For example, the VR platform (e.g., VR platform 220, using server device 222, storage device 226, processor 320, storage component 340, etc.) may obtain a set of objects to use within the virtual workshop, as described above in connection with FIGS. 1A-1D. The set of objects may include objects capable of being used to solve a problem that is presented to users within the collaborative virtual environment.

As further shown in FIG. 4, process 400 may include providing the set of objects to the group of user devices to allow the group of user devices to display the set of objects within the virtual workshop (block 430). For example, the VR platform (e.g., VR platform 220, using server device 222, processor 320, output component 360, etc.) may provide the set of objects to the group of user devices (e.g., user devices 210) to allow the group of user devices to display the set of objects within the virtual workshop, as described above in connection with FIGS. 1A-1D.

As further shown in FIG. 4, process 400 may include receiving, from the group of user devices, data describing a set of solutions and/or data describing user feedback relating to the set of solutions (block 440). For example, the VR platform (e.g., VR platform 220, using server device 222, processor 320, input component 350, etc.) may receive, from the group of user devices (e.g., user devices 210), data describing a set of solutions and/or data describing user feedback relating to the set of solutions, as described above in connection with FIGS. 1A-1D.

As further shown in FIG. 4, process 400 may include curating the data describing the set of solutions and/or the data describing the user feedback using one or more natural language processing techniques (block 450). For example, the VR platform (e.g., VR platform 220, using analysis device 224, processor 320, etc.) may curate the data describing the set of solutions and/or the data describing the user feedback using one or more natural language processing techniques, as described above in connection with FIGS. 1A-1D.

As further shown in FIG. 4, process 400 may include ranking the set of solutions that has been curated using a ranking technique or a machine learning technique (block 460). For example, the VR platform (e.g., VR platform 220, using analysis device 224, processor 320, etc.) may rank solutions in the set of solutions using a ranking technique or a machine learning technique, as described above in connection with FIGS. 1A-1D.

As further shown in FIG. 4, process 400 may include providing data identifying a highest ranked solution or the data describing the set of solutions that has been ranked for display within the virtual workshop or to additional devices that are accessible outside of the virtual workshop (block 470). For example, the VR platform (e.g., VR platform 220, using server device 222, display device 228, processor 320, output component 360, etc.) may provide data identifying a highest ranked solution or the data describing the set of solutions that has been ranked for display within the virtual workshop or to additional devices that are accessible outside of the virtual workshop, as described above in connection with FIGS. 1A-1D.

Process 400 may include additional implementations, such as any single implementation or any combination of implementations described below.

In some implementations, the VR platform may receive, from a user device of the plurality of user devices, a request for an additional object. The request may be a request for a virtualized representation of a person, a place, or a thing. Additionally, the VR platform may process information associated with a data source to identify data describing the person, the place, or the thing. Additionally, the VR platform may generate the additional object using the data describing the person, the place, or the thing.

In some implementations, the VR platform may receive the data describing the set of solutions, wherein the set of solutions are of a plurality of data types. In this case, the VR platform may convert the data describing the set of solutions into a uniform format.

In some implementations, the VR platform may identify data that describes a solution, of the set of solutions, as a solution and not user feedback or a question. The data describing the solution may be based on a time period at which the data describing the solution is received, a property of an object that identifies the data describing the solution as the solution, or one or more qualifying statements or syntax values included in the solution of the set of solutions.

In some implementations, the VR platform may generate a set of annotations for the data describing the set of solutions by using a natural language processing technique, of the one or more natural language processing techniques, to process the data describing the user feedback. In this case, the VR platform may execute the ranking technique to rank the set of solutions based on the set of annotations.

In some implementations, the VR platform may generate a set of annotations for the data describing the set of solutions by using a natural language processing technique, of the one or more natural language processing techniques, to compare the data describing the set of solutions to a set of scoring parameters. In this case, the VR platform may execute the ranking technique to rank the set of solutions based on the set of annotations. The scoring parameters may include a parameter indicating a time range in which a solution a particular solution to be implemented, a parameter indicating a cost range associated with implementing the particular solution, a parameter indicating a degree of difficulty associated with implementing the solution, and/or a parameter indicating a risk associated with the particular solution.

In some implementations, the VR platform may generate a first set of annotations for the data describing the set of solutions using the data describing the user feedback. Additionally, the VR platform may generate a second set of annotations for the data describing the set of solutions using a set of scoring parameters. In this case, the VR platform may execute the ranking technique to rank the set of solutions based on the first set of annotations and the second set of annotations.

In some implementations, the VR platform may rank the set of solutions using a data model. In this case, the data model may be trained on historical data relating to other virtual workshops. Additionally, the data model may receive the data describing the set of solutions and/or the data describing the user feedback, may process the data, and may output a set of values that are to be used to rank the set of solutions. In some cases, the set of values may be used to rank additional solutions that were submitted by previous users that used the collaborative virtual environment to discuss solutions relating to a similar problem.

In some implementations, the VR platform may provide, after a particular solution, of the set of solutions, is selected as a solution that is to be implemented, one or more additional objects to the plurality of user devices to allow the plurality of user devices to display the one or more additional objects within the collaborative virtual environment. Additionally, the VR platform may receive, from the plurality of user devices, data describing a set of implementation solutions. In this case, the VR platform may curate the data describing the set of implementation solutions, and may rank the set of implementation solutions. Furthermore, the VR platform may provide data identifying a highest ranked implementation solution or data identifying the set of implementation solutions that has been ranked for display within the collaborative virtual environment or to the additional user devices that are accessible outside of the collaborative virtual environment.

In some implementations, the VR platform may generate, after a particular solution, of the set of solutions, is selected as a solution to be implemented, one or more sets of additional objects that identify an implementation plan of the solution that is to be implemented. Additionally, the VR platform may provide the one or more sets of additional objects to the plurality of user devices to allow the plurality of user devices to display the one or more sets of additional objects within the collaborative virtual environment.

In some implementations, the VR platform may generate, after a particular solution, of the set of solutions, is selected as a solution to be implemented, one or more sets of additional objects that identify a protocol for the particular solution. Additionally, the VR platform may provide the one or more sets of additional objects to the plurality of user devices to allow the plurality of user devices to display the one or more sets of additional objects within the collaborative virtual environment.

In some implementations, the VR platform may generate, after a particular solution, of the set of solutions, is selected as a solution to be implemented, one or more sets of additional objects that enable the plurality of user devices to simulate an implementation of the particular solution. Additionally, the VR platform may provide the one or more sets of additional objects to the plurality of user devices to allow the plurality of user devices to display the one or more sets of additional objects within the collaborative virtual environment.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

In this way, the VR platform is able to intelligently orchestrate a virtual workshop for a group of users. Furthermore, by providing additional services to supplement the virtual workshop (e.g., by providing objects tailored to the virtual workshop, by automatically ranking the solutions, etc.), the VR platform reduces a utilization of resources (e.g., processing resources, network resources, etc.) needed to complete the virtual workshop.

For example, without providing objects tailored to the virtual workshop (e.g., a virtual representation of a product being modified, a prototype that is to be further developed, a real-time summary of solutions and user feedback, etc.), the users may spend more time brainstorming within the virtual workshop, may take longer to come up with solutions, and/or the like, which may require the group of user devices to utilize resources that would not be needed if the users were able to more efficiently select and identify solutions during the virtual workshop. As another example, without a service to automatically rank the solutions, the users may need to engage in further collaboration to determine which solution to select, and why, and the further collaboration may require the group of user devices to utilize resources that are not needed in a collaborative virtual environment that automatically ranks the solutions.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Certain user interfaces (e.g., virtual interfaces) have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   provide, to a plurality of user devices, a set of objects to use in a collaborative virtual environment,
      wherein the collaborative virtual environment is associated with a group of users to collaborate or brainstorm,
      wherein the collaborative virtual environment supports a virtual workshop that is a virtual reality and/or augmented reality representation of an in-person workshop, and
      wherein the set of objects includes objects being used to solve a problem that is presented to users within the virtual workshop;
   provide, to the plurality of user devices, an interface for displaying the virtual workshop;
      wherein the virtual workshop includes a virtual whiteboard;
   receive, from the plurality of user devices, data associated with the virtual workshop;
   determine whether the data relates to data describing a set of solutions or data describing user feedback;
   provide for display, on the virtual whiteboard, information related to the set of solutions or information related to the user feedback based on determining whether the data relates to the data describing the set of solutions or the data describing the user feedback,
      wherein the information related to the set of solutions and the information related to the user feedback are displayed on the virtual whiteboard as a solution or as user feedback;
   curate the data associated with the virtual workshop using one or more natural language processing techniques;
   rank the set of solutions that has been curated using a ranking technique or a data model; and
   provide data identifying a highest ranked solution or data identifying the set of solutions for display within the virtual workshop and to one or more additional user devices that are accessible outside of the virtual workshop.

2. The device of claim 1, wherein the one or more processors are further to:
   receive, from a user device of the plurality of user devices, a request for an additional object,
      wherein the request is a request for a virtualized representation of a person, a place, or a thing;
   process information associated with a data source to identify data describing the person, the place, or the thing; and
   generate the additional object using the data describing the person, the place, or the thing.

3. The device of claim 1, wherein the one or more processors, when curating the data associated with the virtual workshop, are to:

generate a set of annotations for the data describing the set of solutions by using a natural language processing technique, of the one or more natural language processing techniques, to process the data describing the user feedback; and wherein the one or more processors, when ranking the set of solutions, are to:
execute the ranking technique to rank the set of solutions based on the set of annotations.

4. The device of claim 1, wherein the one or more processors, when curating the data associated with the virtual workshop, are to:
generate a set of annotations for the data describing the set of solutions by using a natural language processing technique, of the one or more natural language processing techniques, to compare the data describing the set of solutions to a set of scoring parameters; and wherein the one or more processors, when ranking the set of solutions, are to:
execute the ranking technique to rank the set of solutions based on the set of annotations.

5. The device of claim 1, wherein the one or more processors, when ranking the set of solutions, are to:
rank the set of solutions using the data model,
wherein the data model has been trained on historical data relating to other virtual workshops, and
wherein the one or more processors cause the data model to:
receive the data associated with the virtual workshop,
process the data associated with the virtual workshop, and
output a set of values that are used to rank the set of solutions.

6. The device of claim 1, wherein the one or more processors are further to:
generate, after a particular solution, of the set of solutions, is selected as a solution to be implemented, one or more sets of additional objects that identify an implementation plan of the solution that is to be implemented; and
provide the one or more sets of additional objects to the plurality of user devices to allow the plurality of user devices to display the one or more sets of additional objects within the collaborative virtual environment.

7. The device of claim 1, wherein the one or more processors are further to:
generate, after a particular solution, of the set of solutions, is selected as a solution to be implemented, one or more sets of additional objects that enable the plurality of user devices to simulate an implementation of the particular solution; and
provide the one or more sets of additional objects to the plurality of user devices to allow the plurality of user devices to display the one or more sets of additional objects within the collaborative virtual environment.

8. A non-transitory computer-readable medium storing instructions, the instructions comprising:
one or more instructions that, when executed by one or more processors, cause the one or more processors to:
receive, from a plurality of user devices, requests to access a collaborative virtual environment to use in a virtual workshop,
wherein the collaborative virtual environment is associated with a group of users to collaborate or brainstorm,
wherein the requests include a workshop identifier associated with the virtual workshop, and
wherein the virtual workshop is a virtual reality and/or augmented reality representation of an in-person workshop;
obtain a set of objects to use within the collaborative virtual environment using the workshop identifier associated with the virtual workshop,
wherein the set of objects include objects being used to solve a problem that is presented to users within the virtual workshop;
provide, to the plurality of user devices, an interface for displaying the virtual workshop,
wherein the virtual workshop includes a virtual whiteboard;
provide the set of objects to the plurality of user devices to allow the plurality of user devices to display the set of objects within the virtual workshop;
receive, from the plurality of user devices, data associated with the virtual workshop;
determine whether the data relates to data describing a set of solutions or data describing user feedback;
provide for display, on the virtual whiteboard, information related to the set of solutions or information related to the user feedback based on determining whether the data relates to the data describing the set of solutions or the data describing the user feedback,
wherein the information related to the set of solutions and the information related to the user feedback is displayed on the virtual whiteboard as a solution or as user feedback;
curate the data associated with the virtual workshop using one or more natural language processing techniques;
rank the set of solutions, that has been curated, using a ranking technique or a data model; and
provide data identifying a highest ranked solution or data identifying the set of solutions that has been ranked to at least one of:
one or more of the plurality of user devices, or
additional user devices that are accessible to users participating in the virtual workshop.

9. The non-transitory computer-readable medium of claim 8, wherein the set of objects include at least one of:
objects relating to user preferences of users that use the plurality of user devices to participate in the virtual workshop,
objects relating to roles that the users are to perform as part of the virtual workshop, or
objects relating to the problem with which the users are tasked with solving.

10. The non-transitory computer-readable medium of claim 8, wherein the one or more instructions, that cause the one or more processors to curate the data associated with the virtual workshop, cause the one or more processors to:
generate a first set of annotations for the data describing the set of solutions using the data describing the user feedback;
generate a second set of annotations for the data describing the set of solutions using a set of scoring parameters; and
wherein the one or more processors, when ranking the set of solutions, are to:
execute the ranking technique to rank the set of solutions based on the first set of annotations and the second set of annotations.

11. The non-transitory computer-readable medium of claim 8, wherein the one or more instructions, that cause the one or more processors to rank the set of solutions, cause the one or more processors to:
rank the set of solutions using the data model,
wherein the data model has been trained on historical data relating to other virtual workshops, and
wherein the one or more instructions, that cause the one or more processors to use the data model to rank the set of solutions, cause the one or more processors to:
provide the data associated with the virtual workshop as input to the data model to cause the data model to output a set of values,
wherein the set of values are used to rank the set of solutions and/or additional solutions that were submitted by previous users that used the collaborative virtual environment to discuss solutions relating to a similar problem.

12. The non-transitory computer-readable medium of claim 8, wherein the one or more instructions, when executed by the one or more processors to, further cause the one or more processors to:
generate, after a particular solution, of the set of solutions, is selected as a solution to be implemented, one or more sets of additional objects identifying an implementation plan or a prototype for the particular solution; and
provide the one or more sets of additional objects to the plurality of user devices to allow the plurality of user devices to display the one or more sets of additional objects within the collaborative virtual environment.

13. The non-transitory computer-readable medium of claim 8, wherein the one or more instructions, when executed by the one or more processors, further cause the one or more processors to:
provide, after a particular solution, of the set of solutions, is selected as a solution that is to be implemented, one or more additional objects to the plurality of user devices to allow the plurality of user devices to display the one or more additional objects within the collaborative virtual environment;
receive, from the plurality of user devices, data describing a set of implementation plans;
curate the data describing the set of implementation plans;
rank the set of implementation plans; and
provide data identifying a highest ranked implementation plan or data identifying the set of implementation plans that has been ranked for display within the collaborative virtual environment or to the additional user devices that are accessible outside of the collaborative virtual environment.

14. A method, comprising:
providing, by a device and to a plurality of user devices, a set of objects to use in a collaborative virtual environment,
wherein the collaborative virtual environment is associated with a group of users to collaborate or brainstorm,
wherein the collaborative virtual environment supports a virtual workshop that is a virtual reality and/or augmented reality representation of an in-person workshop, and
wherein the set of objects include objects being used to solve a problem that is presented to users within the collaborative virtual environment;
providing, by the device and to the plurality of user devices, an interface for displaying the virtual workshop,
wherein the virtual workshop includes a virtual whiteboard;
receiving, by the device and from the plurality of user devices, data;
determining, by the device, whether the data relates to data describing a set of solutions or data describing user feedback;
providing, by the device and for display, on the virtual whiteboard, information related to the set of solutions or information related to the user feedback based on determining whether the data relates to the data describing the set of solutions or the data describing the user feedback,
wherein the information related to the set of solutions and the information related to the user feedback is displayed on the virtual whiteboard as a solution or as user feedback;
curating, by the device, the data using one or more natural language processing techniques;
ranking, by the device, the set of solutions that has been curated using a ranking technique or a machine learning technique; and
providing, by the device, data identifying a highest ranked solution or data identifying the set of solutions for display within the virtual workshop or to one or more additional user devices that are accessible outside of the virtual workshop.

15. The method of claim 14, wherein receiving the data describing the set of solutions comprises:
receiving the data describing the set of solutions,
wherein solutions, of the set of solutions, are of a plurality of data types; and
wherein curating the data describing the set of solutions comprises:
converting the data describing the set of solutions into a uniform format.

16. The method of claim 14, wherein curating the data describing the set of solutions comprises:
identifying data that describes a solution, of the set of solutions, as a solution and not user feedback or a question, based on:
a time period at which the data describing the solution is received,
a property of an object that identifies the data describing the solution as the solution, or
one or more qualifying statements or syntax values included in the solution of the set of solutions.

17. The method of claim 14, wherein curating the data describing the set of solutions comprises:
generating, using the one or more natural language processing techniques, a set of annotations for the data describing the set of solutions using scoring parameters,
wherein the scoring parameters include at least one of:
a parameter indicating a time range in which a solution to the problem is to be implemented,
a parameter indicating a cost range associated with implementing the solution,
a parameter indicating a degree of difficulty associated with implementing the solution, or
a parameter indicating a risk associated with the solution; and
wherein ranking the set of solutions comprises:
executing the ranking technique to rank the set of solutions based on the set of annotations.

18. The method of claim 14, further comprising:
receiving, after receiving the data describing the set of solutions, data describing user feedback relating to the set of solutions;
wherein curating the data describing the set of solutions comprises:
  converting the data describing the set of solutions and the data describing the user feedback,
  generating a set of annotations for the data describing the set of solutions by using a natural language processing technique, of the one or more natural language processing techniques, to process the data describing the user feedback; and
wherein ranking the set of solutions comprises:
  executing the ranking technique to rank the set of solutions based on the set of annotations.

19. The method of claim 14, wherein ranking the set of solutions using the machine learning technique comprises:
ranking the set of solutions using a data model,
  wherein the data model has been trained on historical data relating to other virtual workshops, and
  wherein using the data model to rank the set of solutions comprises:
    providing the data describing the set of solutions as input to the data model to cause the data model to output a set of values,
      wherein the set of values are used to rank the set of solutions and/or additional solutions that were submitted by previous users that used the collaborative virtual environment to discuss solutions relating to a similar problem.

20. The method of claim 19, further comprising:
generating, by the device and after ranking the set of solutions, one or more particular objects identifying an implementation plan or a prototype for the highest ranked solution; and
wherein providing the data identifying the highest ranked solution comprises:
  providing the one or more particular objects to one or more other user devices to allow the one or more other user devices to display the one or more particular objects within the collaborative virtual environment.

* * * * *